United States Patent
Simonoff

(10) Patent No.: US 7,945,084 B2
(45) Date of Patent: *May 17, 2011

(54) METHOD OF PRINTING MICR ENCODED NEGOTIABLE INSTRUMENTS SUCH AS CHECKS/DRAFTS FROM FACSIMILE TRANSMITTED CHECKS

(75) Inventor: Jerome Simonoff, Venice, CA (US)

(73) Assignee: Bank of America, National Association, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,527

(22) Filed: Mar. 3, 2010

(65) Prior Publication Data

US 2010/0157379 A1      Jun. 24, 2010

Related U.S. Application Data

(63) Continuation of application No. 11/825,113, filed on Jul. 2, 2007, now Pat. No. 7,702,144, which is a continuation of application No. 11/219,641, filed on Nov. 4, 2005, now Pat. No. Re. 39,875.

(51) Int. Cl.
    G06K 9/00          (2006.01)
(52) U.S. Cl. .......................... 382/139; 382/135; 382/137
(58) Field of Classification Search .................. 382/317, 382/138, 139, 137, 135; 358/1.14, 3.28; 235/379, 380; 347/139; 380/282, 285; 283/72, 283/73; 705/45; 713/716

See application file for complete search history.

(56) References Cited

U.S. PATENT DOCUMENTS

| | | |
|---|---|---|
| 3,950,015 A | 4/1976 | Shrock |
| 4,310,180 A | 1/1982 | Mowry, Jr. et al. |
| 4,640,018 A | 2/1987 | Gigliotti |
| 4,722,554 A | 2/1988 | Petit |
| 4,947,321 A | 8/1990 | Spence et al. |
| 4,973,851 A | 11/1990 | Lee |
| 4,974,878 A | 12/1990 | Josephson |
| 5,030,977 A | 7/1991 | Hanson et al. |
| 5,097,517 A | 3/1992 | Holt |
| 5,254,196 A | 10/1993 | Abowitz et al. |
| 5,265,007 A | 11/1993 | Barnhard, Jr. et al. |
| 5,337,122 A | 8/1994 | Hubble, III et al. |
| 5,347,302 A | 9/1994 | Simonoff |
| 5,477,037 A | 12/1995 | Berger |
| 5,550,932 A | 8/1996 | Blaylock et al. |
| 5,583,759 A | 12/1996 | Geer |
| 5,631,984 A | 5/1997 | Graf et al. |
| 5,717,868 A | 2/1998 | James |

(Continued)

FOREIGN PATENT DOCUMENTS

EP          0569171        11/1993

(Continued)

*Primary Examiner* — Anh Hong Do
(74) *Attorney, Agent, or Firm* — Banner & Witcoff, Ltd.; Michael Springs

(57) ABSTRACT

An improved method for accurately and correctly encoding and printing complete checks on blank paper sheets from graphic check images. The method includes inputting into a computer a graphic image of a check. Scanning the graphic image, in computer memory, and identifying the MICR character codes with their locations. Printing said MICR codes with magnetic ink in MICR fonts in a designated "clear band". Reformatting the scanned graphic image with the MICR images deleted and printing the reformatted graphic image above the "clear band" to provide a negotiable check instrument.

33 Claims, 2 Drawing Sheets

U.S. PATENT DOCUMENTS

| | | |
|---|---|---|
| 5,748,755 A | 5/1998 | Johnson et al. |
| 5,910,988 A | 6/1999 | Ballard |
| 5,930,778 A | 7/1999 | Geer |
| 6,032,137 A | 2/2000 | Ballard |
| 6,125,196 A | 9/2000 | Carey et al. |
| 6,697,512 B2 | 2/2004 | Simonoff |
| RE39,875 E | 10/2007 | Simonoff |
| RE40,220 E | 4/2008 | Nichols et al. |
| 7,702,144 B2 * | 4/2010 | Simonoff ............ 382/139 |

FOREIGN PATENT DOCUMENTS

| | | |
|---|---|---|
| JP | 2286361 | 11/1990 |

* cited by examiner

METHOD OF PRINTING MICR ENCODED NEGOTIABLE INSTRUMENTS SUCH AS CHECKS/DRAFTS FROM FACSIMILE TRANSMITTED CHECKS

CROSS-REFERENCE TO RELATED APPLICATIONS

This is a continuation of prior U.S. patent application Ser. No. 11/825,113, filed on Jul. 2, 2007, which is a continuation of Ser. No. 11/219,641, filed on Nov. 4, 2005, now U.S. Pat. No. RE39,875 issued Oct. 9, 2007, which is a reissue application of U.S. patent application Ser. No. 09/793,474, filed on Feb. 26, 2001, now U.S. Pat. No. 6,697,512, issued Feb. 24, 2004, which is a continuation of U.S. patent application Ser. No. 08/373,118, filed on Jan. 17, 1995, now U.S. Pat. No. 6,195,453, issued Feb. 27, 2001.

BACKGROUND OF THE INVENTION

1. Field of the Invention

The present invention relates generally to imprinting complete negotiable instruments and more particularly pertains to a method of encoding and printing complete authorized checks/drafts on blank paper sheets from facsimile transmitted checks.

2. Description of the Prior Art

In the past as in the present the exchange of funds both personal and business has been by negotiable instruments such as drafts and checks. Physical transmission and exchange of such instruments has been by mail or messenger. Such instruments for example, checks, must on their face, include at the least all the necessary information pertaining to the issuing bank and the drawer or payor of the check. In addition, the check also bears a series of magnetic ink characters identifying the issuing bank and the drawer and other information for later processing of the check by banks and the Federal Reserve System. The magnetic ink characters must be located within a specific area on the check and conform to specific standards. The payor fills in the check number, the dollar amount of the check, the name of the payee and the date as well as signing the check.

In order to shorten the transit time and thereby hasten the exchange of funds it has been a common practice send the necessary instruments by overnight mail or some other costly delivery services.

Although all businesses and most homes have ready access to facsimile machines, the use of such devices can not be employed for the transmission of checks and drafts. The banking industry system requires that certain codes be present at the bottom of the instrument in order to be accepted and processed by the banking system. These codes must be printed in a magnetic ink or toner, be very precisely positioned on the face of the check instrument and be printed in a font which demands greater resolution and reliability then can be currently produced with any presently available facsimile equipment.

Specifically, in accordance with present standards, checks and other similar commercial documents are required to meet and conform to certain standards. One such standard is Standard X9.27 entitled "Print Specifications for Magnetic Ink Character Recognition" and referred to as "MICR". This standard is issued by the Accredited Standards Committee on Financial Services under the procedures of the American National Standards Institute and Published by the X9 Secretariat of the American Bankers Association. The specification sets forth the specific type fonts and special toners that must be used in the printing of these documents. Specification X9.13 entitled "American National Specifications for Placement and Location of MICR Printing" imposes stringent requirements for the placement of the MICR characters on checks. This specification delineates the very precise positioning of the MICR print characters relative to the edges of the check form. The specification also prohibits magnetic printing other than MICR characters within the character recognition reading area. The reading area is defined as a "Clear Band (MICR) A Band 0.625 inch high, measured from the aligning edge of the document, parallel to that edge and extending the length of the document. It is reserved for imprinting of MICR characters."

There are presently available computer software programs and published material for converting facsimile images received on a telephone line directly into a computer memory. The received data facsimile signals are converted into digital representations of rasterized images through selected available electronic devices. In addition, currently available computer software programs and methodology enable a computer to analyze digital image representations and through the use of Optical Character Recognition (OCR) techniques to convert these images in ASCII or other computer code character representations. This technique is generally used to bring facsimile transmissions into word processing and other software without requiring separately keying of the information into the system.

Laser printer technology has advanced to the point at which special toners and fonts can be used to laser print checks that meet MICR standards directly as outputted from a computer. Presently available computer software programs are capable of printing MICR encoded checks.

In those situations where even overnight delivery is not sufficiently fast, there are speedier services. One such service includes a service provider acting on behalf of a client company. A sender wishing to convey funds to the client company telephones the client company and verbally conveys the necessary bank information including processing codes, all the information found on the face of a check and authorization to draw a draft on the sender's bank. The service provider will then generate a bank draft based on the telephoned information against the sender's account and deposit the draft in the client company's bank account.

The forgoing situation readily lends itself to the generation of an incorrect draft document occasioned by the verbal transmission of the check data. For example, the operation can generate a draft in the wrong amount or against an incorrect account both of which errors can create severe problems for the parties involved. For these reasons it would be desirable generate to the draft document without any verbal communication or additional input keying.

Recent technology has made available computer driven laser printers which are capable of printing special type font characters in magnetic ink using special toners. Such printing meets the MICR standard. Presently marketed laser printers produce high quality graphics without any noticeable distortion because they print using dots with extremely close spatial relationships to other dots on the same sheet. Therefore, laser printers are capable of extreme accuracy in the placement of images with respect to other images printed on the same sheet during the same operation.

SUMMARY OF THE INVENTION

The present invention comprises a method of accurately and properly printing a check on a blank paper sheet based on a graphic image representation of an original check. The laserprinted check includes the proper and accurate positioning of specific magnetic ink characters on its face.

The method of the present invention can be embodied in a single computer program or in a series of inter-related programs. In its broadest aspect, the method includes (at least) the following steps 1) inputting into a computer a graphic image of a negotiable instrument (i.e. a check) including MICR codes; 2) storing said image in a formatted image file in said computer; 3) scanning said image and identifying MICR character codes and their respective locations; 4) laser printing said MICR codes with magnetic ink, in MICR fonts in a designated "clear band" area; 5) reformatting said graphic image without the MICR character codes and 6) printing said reformatted image above said "clear band" in a position defined check zone to provide a negotiable instrument based on the originally inputted graphic image.

Although it is believed that the foregoing steps are adequate to properly practice the instant invention, additional steps can also be included to insure greater accuracy and prevent errors. Such method would include the following steps: 1) inputting into a computer a graphic image of a negotiable instrument (i.e. a check) including MICR codes; 2) storing said image in a formatted image file in said computer; 3) scanning said image and identifying MICR character codes and their respective locations; 4) identifying the MICR "routing marks" and their respective locations; 5) verifying the validity of the MICR numerical character codes associated with the "routing marks" 6) laser printing said MICR codes with magnetic ink, in MICR fonts in a designated "clear band" area; 7) reformatting said graphic image without the MICR character codes; 8) printing said reformatted image above said "clear band" in a position defined check zone to provide a negotiable instrument based on the originally inputted graphic image; and 9) prior to printing, displaying an image of the negotiable instrument to be printed for the purpose of correcting any errors.

The above described method has found utility in the rapid transfer and exchange of funds by facsimile transmission of negotiable instruments such as checks. The facsimile transmitted check includes all the necessary check data and, in addition, if required, an authorization by the payor to permit the recipient or another to negotiate an instrument based on the transmitted check. The facsimile transmitted check image is received and inputted directly into a computer by available software. Appropriate computer software programs also residing in the computer first analyze the check image via OCR software in order to recognize and identify the MICR codes associated with the transmitted facsimile check. The computer further includes MICR fonts as well as MICR print positioning instructions. The MICR identified codes are sent to a laser printer loaded with specifically formulated magnetic toner and MICR fonts. The laser printer then prints the MICR code information in conformity to the banking industry specifications.

The computer program deletes the original MICR code line from the stored received facsimile check image and then reformats and sizes the remaining check image while adding any other necessary data such as identifying the resulting document as an instrument created based on permission of the payor. The printer thereupon prints the reformatted check zone image above the MICR "clear band" code information. The computer software can also be directed to display the draft document prior to printing to permit the user to examine and confirm the MICR printing and the legibility and the accuracy of the check data. After printing the resulting document can be deposited in the recipient's bank account just as any other check or negotiable instrument.

Accordingly, it is an object of this invention to provide an improved method for imprinting a check or other negotiable instrument on a blank paper sheet from a facsimile transmitted image using a laser printer.

Another object of this invention is to provide a method for the printing of a check which conforms to banking industry standards from a facsimile graphic check image.

Still another object is to provide an improved method for printing of a complete check from a facsimile check without requiring additional input data keying.

A further object of the present invention is to provide a reliable, positive and low cost method for imprinting complete checks or negotiable instruments from graphic check images.

Other objects and many of the attendant advantages of this invention will be readily appreciated as the same becomes better understood by reference to the following detailed description when considered in connection with the accompanying drawings in which like references numerals designate like parts throughout the figures thereof.

DETAILED DESCRIPTION OF THE PREFERRED METHOD

Figure 1:
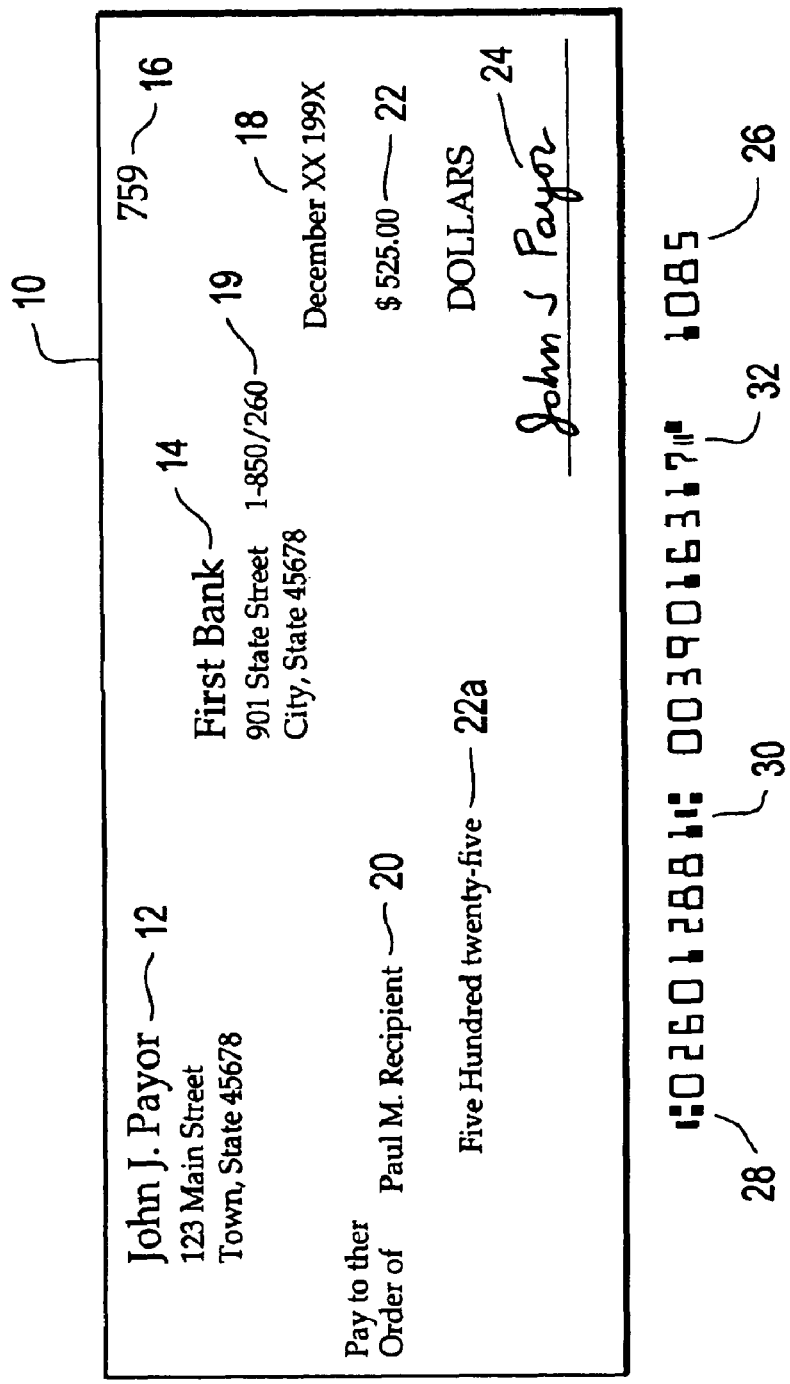
FIG. 1 is a representation of a facsimile transmitted check.

There are currently available a multitude of devices and supporting software programs for the transmission of facsimile messages and information from one computer to another computer. The transmitted information is generally in the form of a graphic representation and may be displayed on the computer monitor for viewing and reading by an operator. The illustration of FIG. 1 represents a check 10 which was originally in a fill-in type check form with a MICR encoded line (magnetic ink) and thereafter filled-in by the payor. A copy of such filled-in completed check was facsimile transmitted from a first computer and received by a second remote computer.

Figure 2:
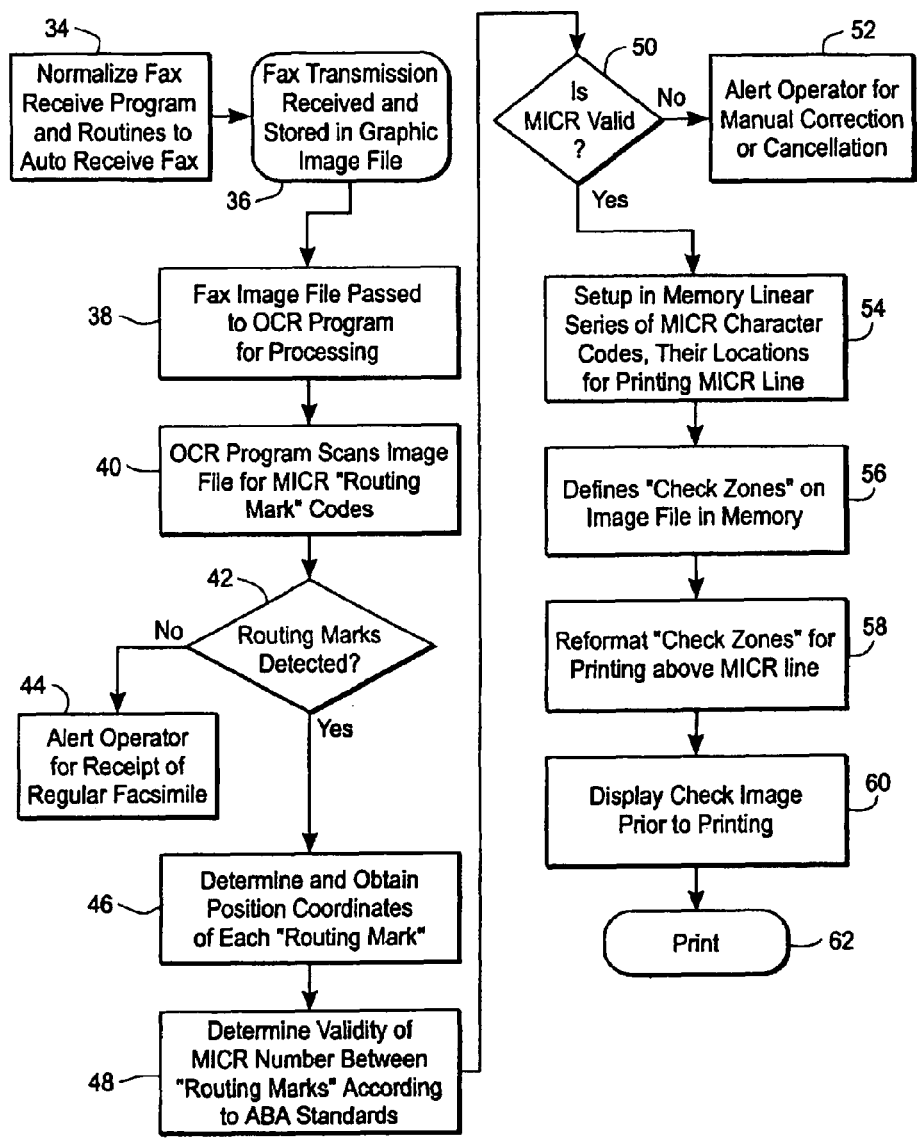
FIG. 2 is a computer program flow chart suitable for practicing the method of this invention.

A valid check, as a minimum, should include the name of the payor 12, the institution against which the funds will be drawn 14, the check number 16, the date 18, transit number 19, name of the recipient to whom the funds are transferred 20, the amount of the funds being transferred 22 and 22a, the signature of the payor 24, and the MICR codes 26 associated with the payor's account. The MICR code line includes representative "routing mark" 28 and 30 and an "OnUs" code symbol 32 all in accord with the American Banking Association standards. Referring now to the flow chart of FIG. 2 which exemplifies the method of operation for practicing the principle of the instant invention. The computer which is to receive the transmitted check facsimile is loaded with a number of software programs in order to perform the necessary required method steps to carry out the function.

The start operation at 34 serves to initialize the Facsimile Receive program and its included routines to provide automatic facsimile receipt. The system at 36 waits for the receipt of a facsimile and when a facsimile is received it causes the graphic facsimile image to be stored in an appropriate graphic image file. Thereafter at 38 the contents of the facsimile image file are passed to an Optical Recognition Reader (OCR) program for processing. Software programs are currently available to perform the foregoing receipt and transfer functions and operations. One such program is entitled VISUAL FAX™ and is distributed by Stylus Innovation, Inc. of Cambridge, Mass.

Upon receipt of the graphic image at 40, an OCR program is instructed to scan the image for the two MICR "routing mark" (American Banking Association [ABA] defined) codes. A suitable OCR program is one distributed by MAX-SOFT-OCRON, Inc. of Fremont, Calif. under the Recore® trademark. Decision box 42 examines whether the "routing marks" were detected. If the marks were not detected then function box 44 is activated to alert an operator that the received facsimile was not that of a check. The operator can then treat the received fax as a regular message facsimile. If, however the "routing marks" were detected such information is passed onto function box 46 where the position co-ordinates of each "routing mark" are obtained.

Using the locations of the "routing marks", the program at 48 is instructed to examine the MICR numbers represented by the MICR codes between the "routing marks" and ascertain whether these numerical MICR codes are valid according to ABA standards. The validity determination may include examining that the "check digit", the number of digits and the location of special characters.

The validity determination at 48 is applied to the decision box 50. If the MICR is invalid then at 52 the operator is alerted to this fact and at that point can either manually correct the MICR or terminate the operation. If the MICR is valid then the program at 54 is instructed to construct in a check image memory file the correct series of MICR code characters and their respective check locations in a linear array for subsequent printing. A laser printer equipped with MICR magnetic toner and With the MICR character font installed therein is used to print the check.

The image processing program at 56 defines in memory the two check zones (i.e. MICR line and the remainder of the check). At 58 the image processing program reformats the entire check zone (i.e. resizes) and positions the check zones above the previously defined MICR for printing to thereby provide a printable output check image. Prior to printing, the check image may be visually displayed at 60 to permit an operator to ascertain whether it is correct. At 62 the remainder (reformatted check zone) of the check image is printed above the previously printed MICR line and a copy faxed to the payor. The system then awaits notification the fax copy sent was received. Although the foregoing inventive method has been described with reference to a facsimile arrangement wherein communications are conducted between two computers it also can be applied under other circumstances. For example, where the received facsimile of the check is received on a facsimile machine and a hard copy (paper) is produced. The paper check image can then be scanned and the resulting image inputted directly into the computer. It should be noted that the described method relies only on the graphic check image being inputted into the computer for processing. It does not matter how or in what form the graphic image is applied to the computer. Obviously many modifications and variations of the present invention are possible in the light of the above teachings. It is therefore understood that, within the scope of the appended claims, the invention may be practiced otherwise than specifically described.

The invention claimed is:

1. A method of reproducing a check comprising:
   receiving at a computer an image representing a check and including a first portion that includes an image of codes in a MICR code line and a second portion that includes at least an image of a signature;
   the computer identifying a sequence of the codes in the MICR code line; and
   printing a reproduced check by:
      printing, in a clear band area, the identified codes using ink and MICR fonts; and
      printing, outside the clear band area, at least the second portion of the image;
   wherein the reproduced check is a negotiable instrument suitable for automatic processing by a banking system.

2. The method of claim 1, wherein the second portion of the image excludes the MICR code line.

3. The method of claim 1, wherein the image of the check is an electronically transmitted image received from a remote location.

4. The method of claim 3, wherein the step of identifying the sequence of the codes, includes processing the image to identify the sequence of the codes and their respective positions.

5. The method of claim 4, wherein the step of printing the sequence of codes includes the proper positioning, on the reproduced check, of the printed ink MICR codes.

6. The method of claim 3, further comprising verifying the validity of at least part of the sequence of codes in the MICR code line prior to printing the reproduced check.

7. The method of claim 1, further comprising displaying an image of check prior to being printed.

8. The method of claim 1, wherein receiving the image comprises receiving a graphical image of unknown content, and wherein said method further comprises:
   scanning the graphical image for one or more MICR routing marks; and
   based on the presence of the one or more MICR routing marks, identifying the image as an image representing the check.

9. A computer program product for causing reproduction of a check, comprising a computer readable storage medium comprising:
   a first set of instructions for causing receipt of an image representing a check including a first portion that includes an image of codes in a MICR code line and a second portion that includes at least an image of a signature;
   a second set of instructions for causing identification of a sequence of the codes in the MICR code line; and
   formatting instructions, for use in formatting for printing a reproduced check by printing, in a clear band, the identified codes using ink and MICR fonts; and by printing outside the clear band area at least the second area of the graphic image;
   wherein the reproduced check is a negotiable instrument suitable for automatic processing by a banking system.

10. The computer program product of claim 9, wherein the formatting instructions include instructions for reformatting the second portion of the image to exclude the MICR code line.

11. The computer program product of claim 9, further comprising instructions for verifying the validity of at least part of the sequence of codes in the MICR code line prior to printing the reproduced check.

12. The computer program product of claim 9, wherein receiving the image comprises receiving a graphical image of unknown content, and wherein said first set of instructions further cause scanning the graphical image for one or more MICR routing marks and, based on the presence of the one or more MICR routing marks, identifying the image as an image representing the check.

13. A method of reproducing a check comprising:
receiving by a computer an image of a check including a first portion having MICR codes and a second portion that includes at least a signature;
the computer identifying a sequence of the MICR codes;
the computer verifying the validity of at least part of sequence of MICR codes;
creating an image of at least the second portion of the check; and
printing a reproduced check by:
printing, in a clear band area, the identified codes using ink and MICR fonts; and
printing, outside the clear band area, at least the second portion of the image,
wherein the reproduced check is a negotiable instrument suitable for automatic processing by a banking system.

14. The method of claim 13, further comprising detecting routing marks in the MICR codes.

15. The method of claim 13, wherein the image of receiving the check includes receiving an image of the check electronically transmitted from a remote location.

16. The method of claim 15, wherein the step of identifying the sequence of the codes, includes processing the image to identify the sequence of the codes and their respective positions.

17. The method of claim 15, further comprising displaying an image of check prior to being printed.

18. The method of claim 14, wherein the step of printing the sequence of codes includes the proper positioning, on the reproduced check, of the printed ink MICR codes.

19. A method of reproducing a check comprising:
a computer receiving an image of unknown content;
scanning the image for one or more MICR routing marks;
based on the presence of the one or more MICR routing marks, the computer determining that the image represents a check and includes a first portion that includes an image of codes in a MICR code line and a second portion that includes at least an image of a signature;
the computer identifying a sequence of the codes in the MICR code line;
storing in memory the sequence of the identified MICR codes; and
storing in memory the second portion of the received check image.

20. The method of claim 19 further comprising:
printing a reproduced check by:
printing, in a clear band area, the sequence of identified codes using ink and MICR fonts; and
printing, outside the clear band area, at least the second portion of the image; wherein the reproduced check is a negotiable instrument suitable for automatic processing by a banking system.

21. The method of claim 20, wherein the printing of the sequence of codes includes proper positioning, on the reproduced check, of the MICR codes.

22. The method of claim 19, wherein the second portion of the image excludes the MICR code line.

23. The method of claim 19, wherein the image of the check is an electronically transmitted image received from a remote location.

24. The method of claim 19, wherein the identifying of the sequence of the codes, includes processing the image to identify the sequence of the codes and their respective positions.

25. The method of claim 19, further comprising verifying the validity of at least part of the sequence of codes in the MICR code line.

26. The method of claim 19, further comprising displaying an image of the reproduced check.

27. The method of claim 19 further comprising:
storing information suitable for printing a reproduced check
wherein the stored information is suitable for printing, in a clear band area, the sequence of identified codes using ink and MICR fonts; and suitable for printing, outside the clear band area, at least the second portion of the image such that the reproduced check is a negotiable instrument suitable for automatic processing by a banking system.

28. The method of claim 18, wherein the identifying includes Optical Character Recognition.

29. One or more computer readable media storing instructions that, when executed, perform a method for causing reproduction of a check, said method comprising:
receiving an image having unknown content;
scanning the image for one or more MICR routing codes;
based on the presence of the one or more MICR routing code, determining that the image represents a check including a first portion that includes an image of codes in a MICR code line and a second portion that includes at least an image of a signature;
identifying a sequence of the codes in the MICR code line;
storing in memory the sequence of the identified MICR codes; and
storing in memory the second portion of the received check image.

30. The computer readable media of claim 29, wherein the method further comprises:
formatting instructions for printing a reproduced check by printing, in a clear band, the identified codes using ink and MICR fonts; and by printing outside the clear band area at least the second portion of the graphic image;
wherein the reproduced check is a negotiable instrument suitable for automatic processing by a banking system.

31. The computer readable media of claim 30, wherein the formatting instructions include instructions for reformatting the second portion of the image to exclude the MICR code line.

32. The computer readable media of claim 29 further comprising instructions for verifying the validity of at least part of the sequence of codes in the MICR code line.

33. The computer readable media of claim 29, wherein the identification includes Optical Character Recognition.

* * * * *